US012196272B2

(12) United States Patent
McKinzie et al.

(10) Patent No.: US 12,196,272 B2
(45) Date of Patent: Jan. 14, 2025

(54) LUBRICATION MANAGEMENT SYSTEM FOR A TRANSMISSION HAVING A HIGH SPEED CLUTCH

(71) Applicant: Deere & Company, Moline, IL (US)

(72) Inventors: Kyle K. McKinzie, Oswego, KS (US); Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 40 days.

(21) Appl. No.: 18/158,580

(22) Filed: Jan. 24, 2023

(65) Prior Publication Data

US 2024/0247691 A1    Jul. 25, 2024

(51) Int. Cl.
| | |
|---|---|
| F16D 25/06 | (2006.01) |
| F16D 25/0638 | (2006.01) |
| F16D 25/12 | (2006.01) |
| F16D 48/02 | (2006.01) |
| F16H 57/04 | (2010.01) |

(52) U.S. Cl.
CPC ......... *F16D 25/14* (2013.01); *F16D 25/0638* (2013.01); *F16D 25/123* (2013.01); *F16H 57/0412* (2013.01); *F16H 57/0473* (2013.01); *F16D 2300/06* (2013.01); *F16D 2500/10412* (2013.01); *F16D 2500/1045* (2013.01);
(Continued)

(58) Field of Classification Search
CPC .............................. F16D 25/0638; F16D 25/14
See application file for complete search history.

(56) References Cited

U.S. PATENT DOCUMENTS 4,661,242 A * 4/1987 Scott ...................... C10G 33/04
208/356
5,613,588 A * 3/1997 Vu .......................... F16D 25/12
192/70.12
(Continued)

FOREIGN PATENT DOCUMENTS

DE    112012004030 T5    7/2014
DE    102017212806 A1    3/2018
(Continued)

OTHER PUBLICATIONS

German Search Report issued in application No. 102023130697.9 dated Jul. 16, 2024, 08 pages.
(Continued)

*Primary Examiner* — Stacey A Fluhart
(74) *Attorney, Agent, or Firm* — KLINTWORTH & ROZENBLAT IP LLP

(57) ABSTRACT

A lubricant management system is provided for a work vehicle transmission. The system includes a balance piston contained in a balance piston cavity configured to receive fluid under pressure and provided between a clutch piston and a balance piston; a cooling fluid shutoff piston mounted in a passageway of the clutch piston; a valve configured to control pressure of fluid flow into the clutch piston cavity; and a controller, having processing and memory architecture, operatively coupled to the valve and configured to command the valve to adjust the pressure of the fluid flowing into the clutch piston cavity during operation of the clutch assembly. The passageway has a lubrication supply opening that is closed by the cooling fluid shutoff piston when a first pressure is within the clutch piston cavity.

11 Claims, 12 Drawing Sheets

(52) U.S. Cl.
CPC ............... *F16D 2500/111* (2013.01); *F16D 2500/30404* (2013.01)

(56) References Cited

U.S. PATENT DOCUMENTS

| | | | |
|---|---|---|---|
| 5,810,142 | A | 9/1998 | Schaefer |
| 7,905,312 | B2 | 3/2011 | Kato et al. |
| 8,453,819 | B2 | 6/2013 | Matranga et al. |
| 8,600,636 | B2 | 12/2013 | Chen et al. |
| 10,288,129 | B2 | 5/2019 | Long et al. |
| 11,174,903 | B1 * | 11/2021 | Vinca ............... F16D 25/0638 |
| 2018/0274600 | A1 * | 9/2018 | Fukuda ............... F16D 25/14 |

FOREIGN PATENT DOCUMENTS

| | | | |
|---|---|---|---|
| DE | 102023125009 | A1 | 5/2024 |
| EP | 3892882 | A1 | 10/2021 |

OTHER PUBLICATIONS

German Search Report issued in application No. 102023130186.1 dated Jul. 15, 2024, 08 pages.
Ex Parte Quayle Action issued Sep. 5, 2024 in U.S. Appl. No. 18/158,566.

* cited by examiner

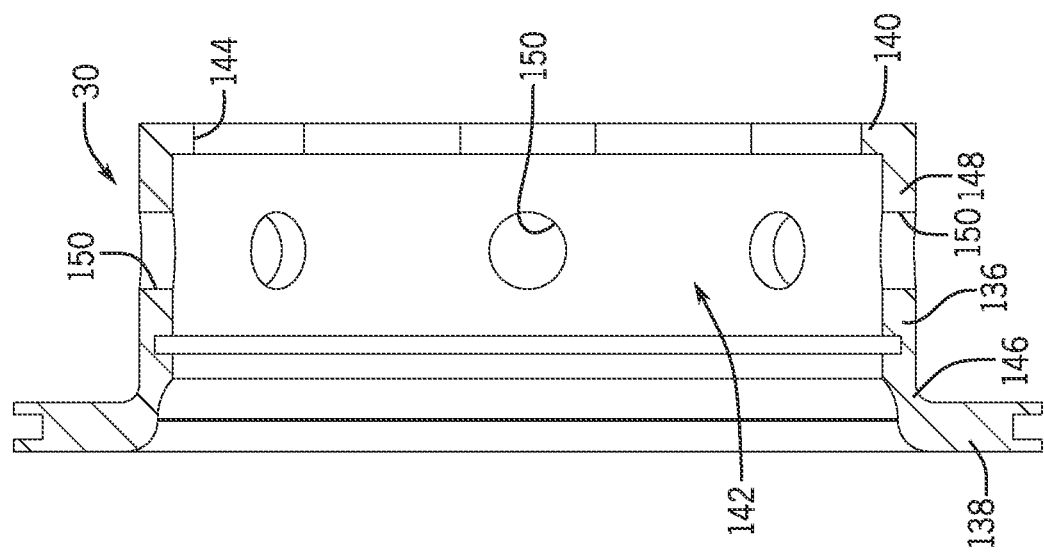
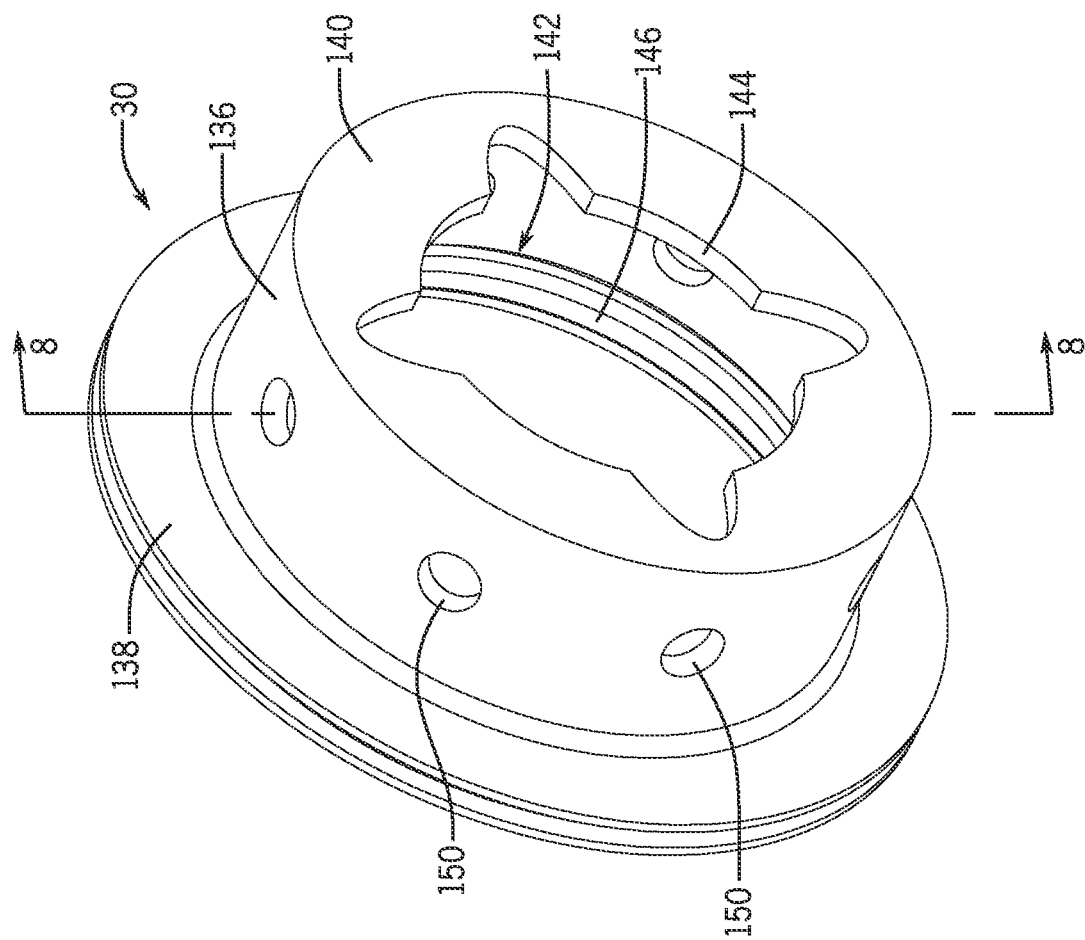

LUBRICATION MANAGEMENT SYSTEM FOR A TRANSMISSION HAVING A HIGH SPEED CLUTCH

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to a lubrication management system for a transmission having a high speed clutch.

BACKGROUND OF THE DISCLOSURE

Transmission assemblies of various kinds for various work vehicles may include gears and associated components arranged to contact a fluid to dissipate heat and ease engagement of mating parts. Cooling is particularly important for certain heat-producing components (e.g., brakes, clutches and the like). Such transmission components (and others) may be configured or located (e.g., nested within other components) such that it may be difficult to adequately deliver the cooling fluid thereto. Cooling arrangements may also realize certain inefficiencies, such as inefficiencies associated with cooling heat-producing components when in non-operational or other states.

A clutch pack of a clutch assembly may generate a considerable amount of heat when utilized to clutch the transmission unit, particularly during periods of relative contacting rotation between the separator plates and the rapidly rotating friction disks as a result of friction. It is thus desirable to dissipate heat by contacting the clutch pack with an active flow of liquid, such as a suitable lubricant. However, due to the relatively tight packaging of the transmission unit, it may be difficult or impractical to deliver sufficient flow to the interior of the clutch pack to cool them adequately and to do so for a duration that is both adequate and efficient.

Due to the architecture, transmission clutches occasionally experience high-speed events which lead to the clutch engaging. Prior art transmission utilize a balance piston to provide a centrifugal balance to the clutch piston, but do not provide for cooling fluid to be supplied to the clutch pack.

The present disclosure presents a transmission unit having a balance piston for balancing the clutch piston, and having a lubrication mechanism that provides for cooling of a clutch pack.

SUMMARY OF THE DISCLOSURE

The disclosure provides a lubricant management system for a work vehicle transmission having a drive shaft and a gear selectively coupled to the drive shaft by a clutch assembly having a clutch piston contained in a clutch piston cavity configured to receive fluid under pressure and a clutch pack. The lubricant management system includes a balance piston contained in a balance piston cavity configured to receive fluid under pressure and provided between the clutch piston and the balance piston; and a cooling fluid shutoff piston mounted in a passageway of the clutch piston; a valve configured to control pressure of fluid flow into the clutch piston cavity; and a controller, having processing and memory architecture, operatively coupled to the valve and configured to command the valve to adjust the pressure of the fluid flowing into the clutch piston cavity during operation of the clutch assembly. The passageway is open to the balance piston cavity and has a lubrication supply opening that is in an open position when the cooling fluid shutoff piston is not within the lubrication supply opening and that is in a closed position when the cooling fluid shutoff piston is within the lubrication supply opening.

The controller is further configured to command the valve to open to allow fluid flow under a first pressure into the clutch piston cavity which engages the clutch piston with the clutch pack in a slip condition, wherein the first pressure allows the cooling fluid shutoff piston to be in the open position.

The controller is further configured to command the valve to open to allow fluid flow under a second pressure into the clutch piston cavity which fully engages the clutch piston with the clutch pack, wherein the second pressure causes the cooling fluid shutoff piston to close the lubrication supply opening. The second pressure is greater than the first pressure.

In an embodiment, the controller acts based upon parameters that are based upon a desired clutch temperature of the clutch pack.

The controller is further configured to command the valve to close when a clutch cycle is completed, thereby preventing fluid flow into the clutch piston cavity and disengaging the clutch piston from the clutch pack, and the cooling fluid shutoff piston is further moved to the closed position when the clutch cycle is completed.

To start a clutch cycle, the controller acts in response to a clutch demand.

In an embodiment, prior to a shift, the controller is further configured to command the valve to open to allow fluid flow under a pressure into the clutch piston cavity to fast fill the clutch piston cavity, and then reduce the pressure into the clutch piston cavity. In an embodiment, a start of the shift, the controller is further configured to command the valve to reopen to allow fluid flow under a pressure into the clutch piston cavity which is less than a pressure required to maintain the cooling fluid shutoff piston in the closed position. In an embodiment, during the shift, the controller is further configured to command the valve to open to allow fluid flow under increasing pressure into the clutch piston cavity, wherein the increasing pressure is always less than a pressure required to maintain the cooling fluid shutoff piston in the closed position. In an embodiment at an end of the shift, the controller is further configured to command the valve to further open to allow fluid flow under a first pressure into the clutch piston cavity, wherein the first pressure is greater than the increasing pressure and less than the pressure required to maintain the cooling fluid shutoff piston in the closed position.

In an embodiment, the controller is further configured to command the valve to open to allow fluid flow under a second pressure into the clutch piston cavity which is greater than the first pressure and which fully engages the clutch piston with the clutch pack, wherein the second pressure causes the cooling fluid shutoff piston to close the lubrication supply opening. In an embodiment, the controller may act to command the valve to open to allow fluid flow under the second pressure based upon parameters that are based upon a desired clutch temperature of the clutch pack.

A transmission unit is also provided which has the lubrication management system.

The details of one or more embodiments are set forth in the accompanying drawings and the description below. Other features and advantages will become apparent from the description, the drawings, and the claims.

BRIEF DESCRIPTION OF THE DRAWINGS

FIG. 7 is a perspective view of a balance piston of the transmission unit;

FIG. 8 is a cross-sectional view along line 8-8 of FIG. 7;

Like reference symbols in the various drawings indicate like elements.

DETAILED DESCRIPTION

Figure 1:
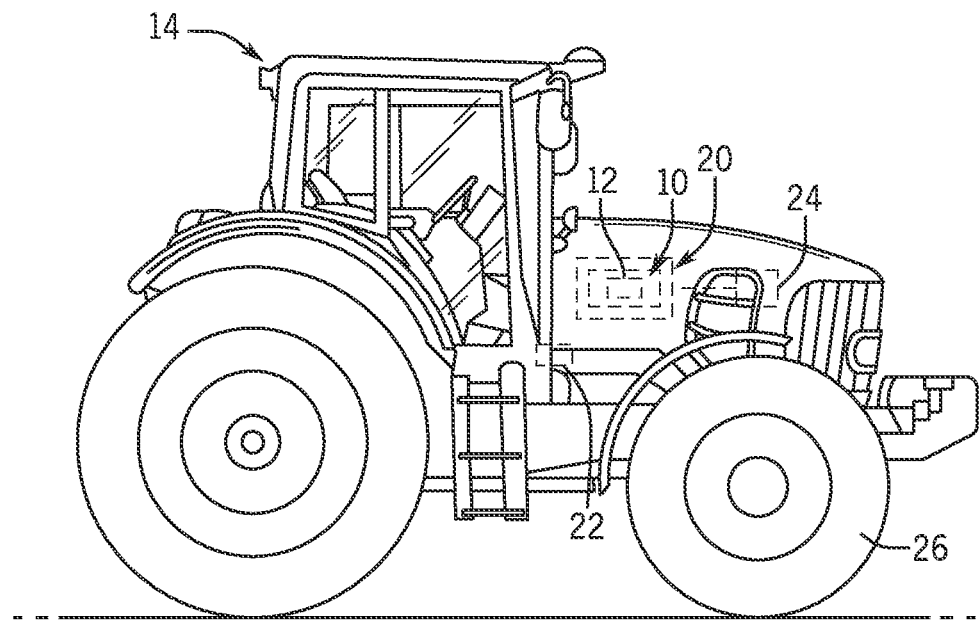
FIG. 1 is a side view of an example work vehicle in accordance with this disclosure.

The following describes one or more example embodiments of the disclosed hitch assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the work vehicle travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes.

This disclosure provides a transmission unit having a clutch piston which is engageable with a clutch pack, a balance piston, and a lubrication mechanism provided in the clutch piston for cooling the clutch pack. The balance piston provides equal and opposite balancing forces to the clutch piston, preventing the clutch piston from self-engaging due to a centrifugal lubricant pressure head. The lubrication mechanism has cooling fluid shutoff pistons which seat within passageways of the clutch piston. The passageways are in fluid communication with a balance piston cavity and a passageway in which the clutch pack is seated. The cooling fluid shutoff pistons of the lubrication mechanism are configured to seat within lubrication supply openings of the clutch piston passageways, and are configured to be unseated from within the lubrication supply openings of the clutch piston passageways. When the cooling fluid shutoff pistons are positioned within the lubrication supply openings, the supply of lubrication which is used to cool the clutch pack is blocked. When the cooling fluid shutoff pistons are not positioned within the lubrication supply openings, the supply of lubrication which is used to cool the clutch pack is allowed. In both positions of the cooling fluid shutoff pistons, the supply of lubrication to the balance piston cavity is always provided. The lubrication supply openings are only unblocked when the clutch is engaged so that the clutch pack is cooled. Since the cooling fluid is prevented from flowing to the clutch pack when the clutch assembly is disengaged, this saves pump energy needs.

The following describes one or more example implementations of the disclosed lubricant mechanism for a transmission unit for a work vehicle, as shown in the accompanying figures of the drawings described briefly above.

Figure 2:
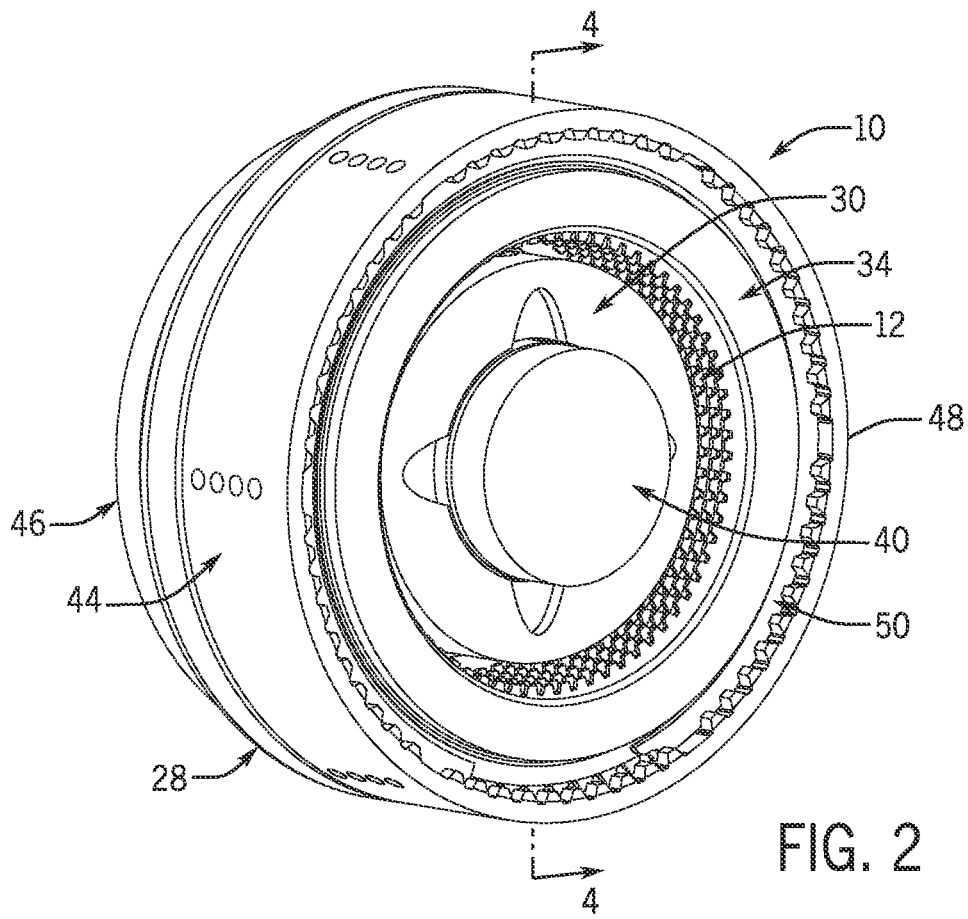
FIG. 2 is a partial isometric view of a transmission unit and drive shaft of the work vehicle.

FIG. 2 shows an example transmission unit 10 having a high speed clutch assembly 12 that may be included in a work vehicle 14, see FIG. 1. The transmission unit 10 includes lubricant flow paths 16a, 16b, 16c that provide fluid flow to a clutch pack 18 of the clutch assembly 12. As will be understood, the transmission unit 10 may be part of the drivetrain 20 of the work vehicle 14 and be operably coupled to a hydraulic and electronic control system 22. The fluid provided to the lubricant flow paths 16a, 16b, 16c is pumped by a pump (not shown) with hydraulic fluid from a tank (not shown) on the work vehicle 14. The components provide a lubricant management system which promotes efficient cooling of the clutch pack 18.

Figure 3:
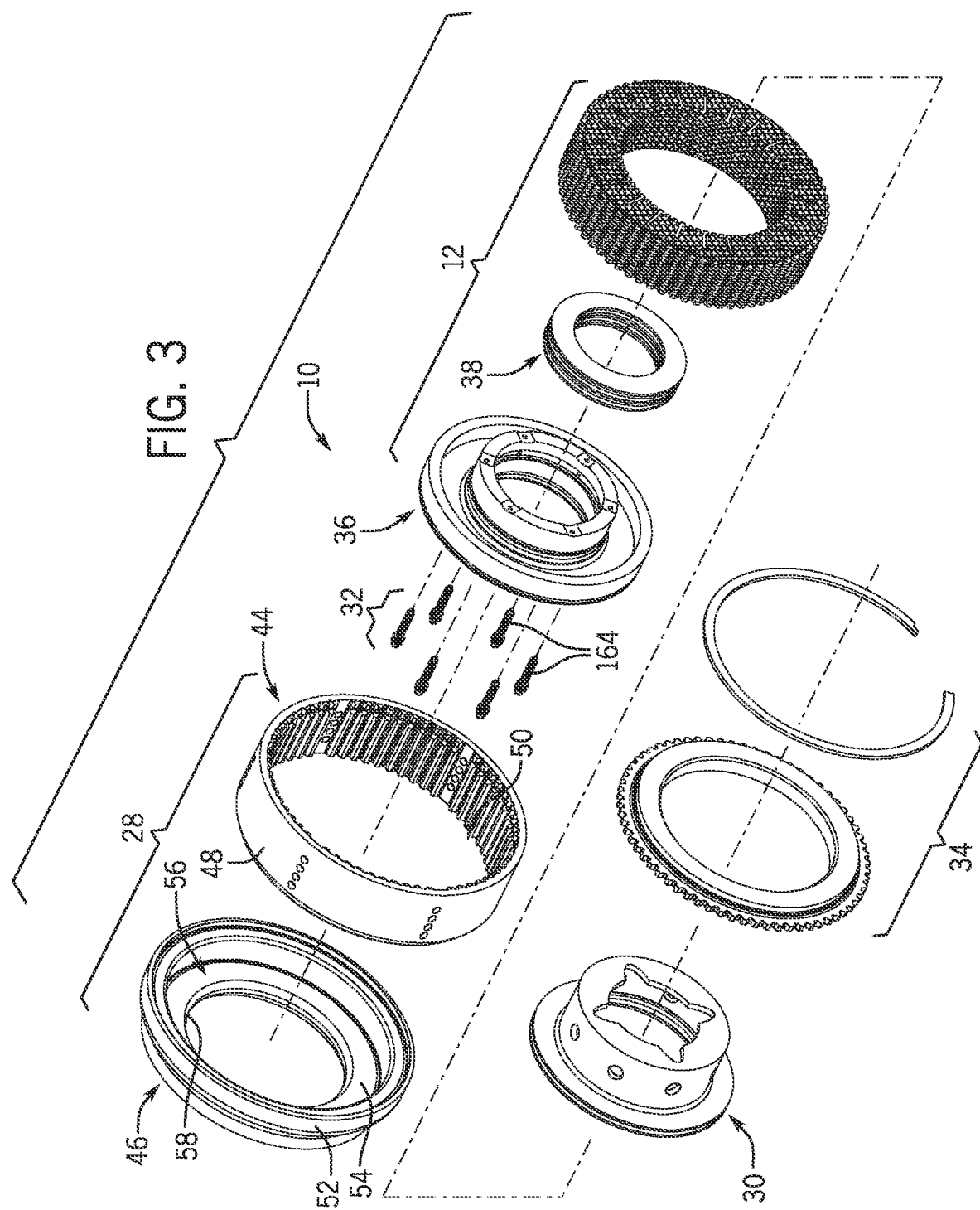
FIG. 3 is an exploded perspective view of the transmission unit.
Figure 4:
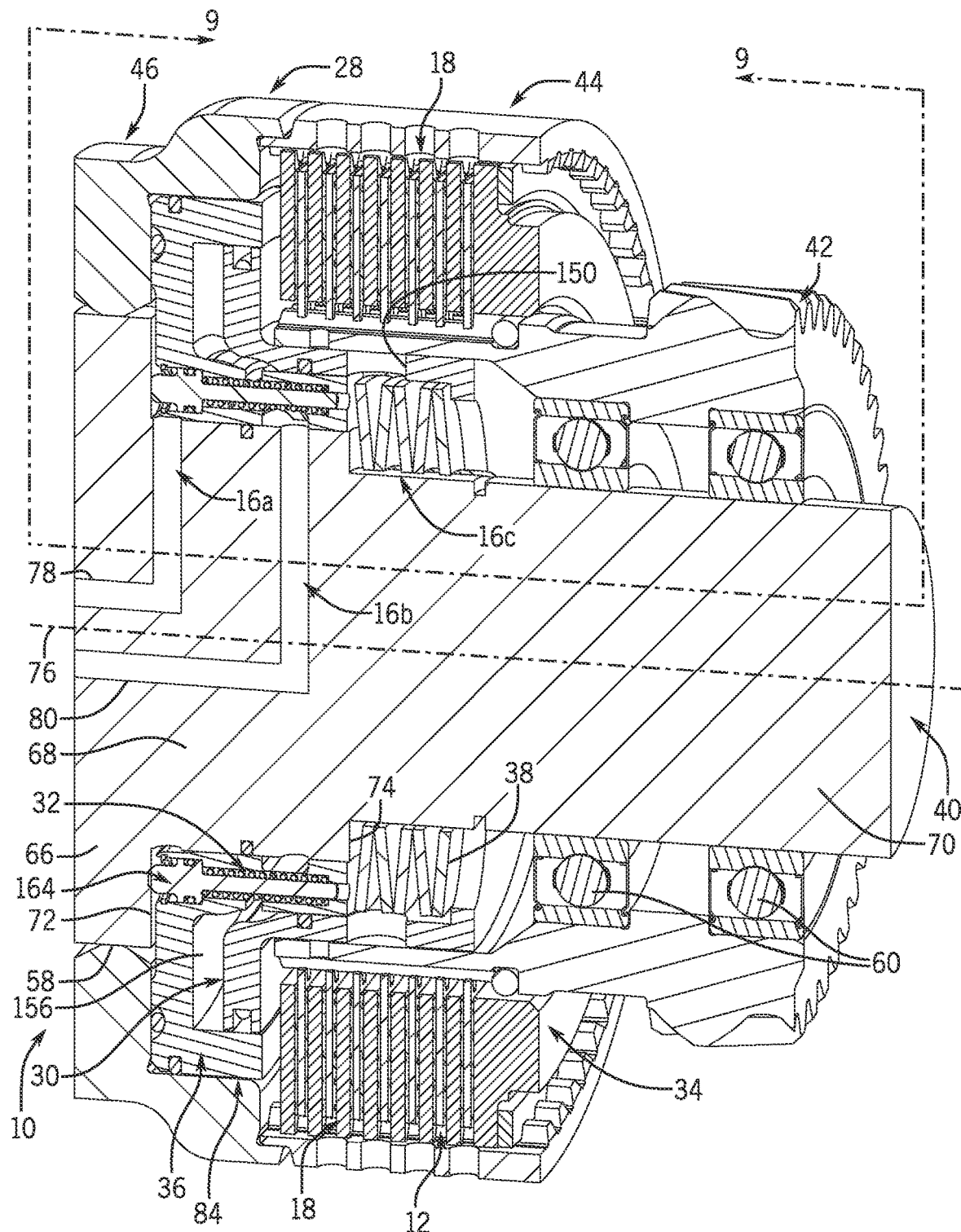
FIG. 4 is a cross-sectional view along line 4-4 of FIG. 2.

Generally, as shown in FIG. 3, the transmission unit 10 includes a housing 28 which houses the clutch assembly 12, a balance piston 30, a lubrication mechanism 32, and a retainer 34. The clutch assembly 12 includes the clutch pack 18, a clutch piston 36 and its return spring 38. The transmission unit 10 is driven by a drive shaft 40. An output gear 42 is rotatably mounted on the drive shaft 40 and is coupled to the clutch assembly 12. The balance piston 30 provides equal and opposite balancing forces to the clutch piston 36, preventing the clutch piston 36 from self-engaging due to a centrifugal lubricant pressure head.

The housing 28 includes a cylindrical drum 44 and a hub 46 which are fixed together, such as by welding. The drum 44 has an annular wall 48 which defines a central passageway 50 and which has a plurality of axially extending splines extending into the central passageway 50. The hub 46 has an outer annular wall portion 52 and an annular end wall portion 54. A central passageway 56 is defined through the hub 46 with the portion of the central passageway 56 which is through the end wall portion 54 defining a reduced diameter opening 58. The central passageway 50 is open at outer axial ends. The housing 28 may be integrally formed of a single piece.

The output gear 42, which may be any suitable type of internal or external gear (e.g., spur, bevel, rack and pinion, etc.), is mounted to the drive shaft 40 at the open end of the housing 28 by one or more rolling element bearings, such as ball bearings 60, which permit the gear 42 to mount and rotate relative to the drive shaft 40. The gear 42 has a hub 62 which extends axially into the passageway 50 of the housing 28. The hub 62 is outwardly axially splined at or near its axially inner ends, and has a plurality of openings 64 therethrough.

The drive shaft 40 has an elongated first cylindrical shaft portion 66, a second cylindrical shaft portion 68 extending from the first shaft portion 66, and a third cylindrical shaft portion 70 extending from the second shaft portion 68. The second shaft portion 68 has a diameter which is less than the diameter of the first shaft portion 66 thereby forming a first shoulder 72, and is greater than the third shaft portion 70 thereby forming a second shoulder 74. A longitudinal axis 76 is defined between the ends of the drive shaft 40. A hydraulic fluid pressure supply passage 78 extends along the first shaft portion 66 and extends radially through the second shaft portion 68. A separate hydraulic fluid supply passage 80 extends along the first shaft portion 66, extends along a portion of the second shaft portion 68, and extends radially through the second shaft portion 68. The passages 78, 80 are spaced apart from each other. Hydraulic fluid, such as lubricant, is introduced into the passages 78, 80, as described herein, from a hydraulic supply (not shown). A control valve 82 is provided along the passage 78 for controlling fluid flow through the passage 78 under control of the hydraulic and electronic control system 22. The first shaft portion 66 seats within the opening 58 of the hub 46 and is fixed thereto, such as by welding, the second and third shaft portions 68, 70 extend through the drum 44, and the third shaft portion 70 extends outwardly from the drum 44. The hub 46, the shoulder 72 and the second shaft portion 68 form a pocket 84.

Figure 6:
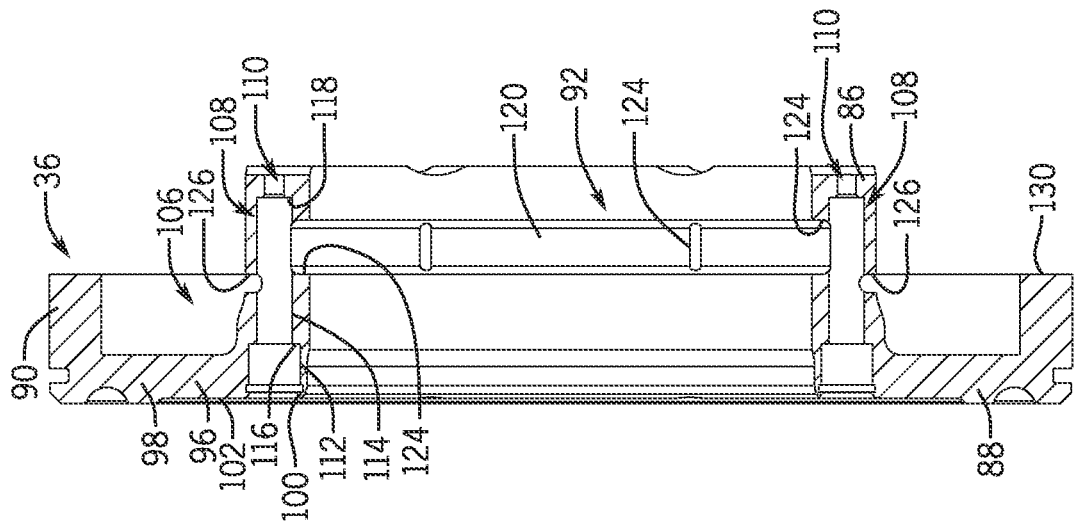
FIG. 6 is a cross-sectional view along line 6-6 of FIG. 5.
Figure 5:
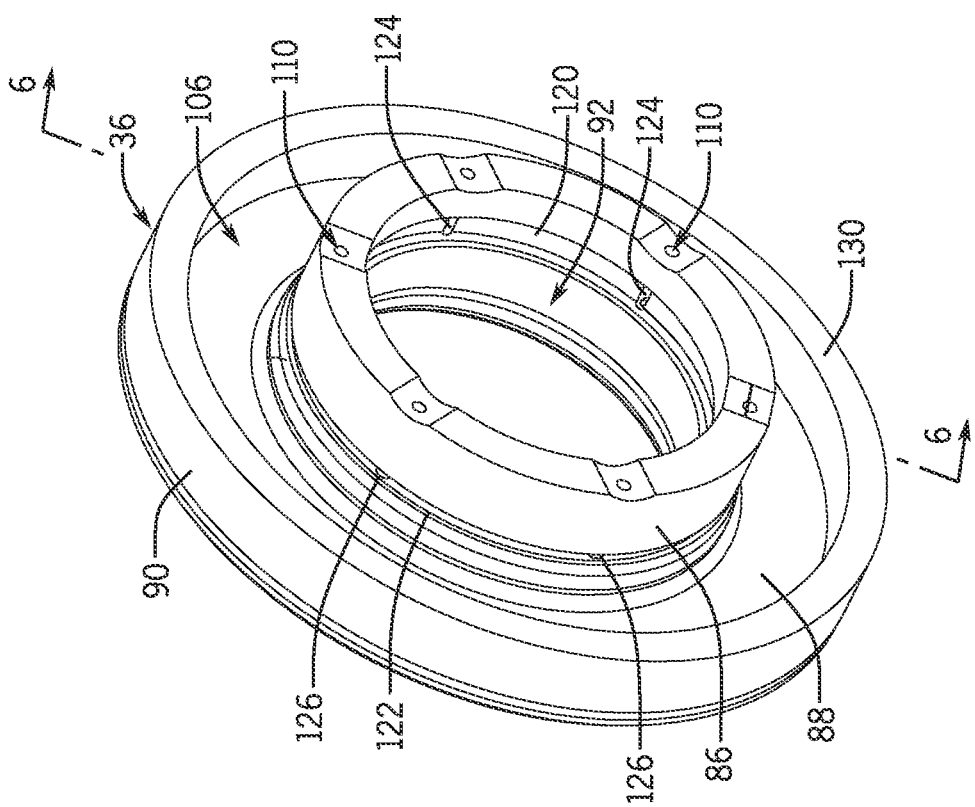
FIG. 5 is a perspective view of a clutch piston of the transmission unit.

The clutch piston 36 seats within the central passageway 50 of the housing 28 proximate to the end wall portion 54 of the hub 46. As shown in FIGS. 5 and 6, the clutch piston 36 of the clutch assembly 12 has a cylindrical first body portion 86 which surrounds the drive shaft 40, an annular second body portion 88 extending radially outward from the first body portion 86, and a cylindrical third body portion 90 extending from the outer end of the second body portion 88. The first and third body portions 86, 90 extend in the same direction. The first body portion 86 defines a central passageway 92 through which the second shaft portion 68 of the drive shaft 40 extends. The first body portion 86 has a length which is greater than the length of the third body portion 90. The clutch piston 36 seats within the pocket 84 with the first body portion 86 engaged with the second shaft portion 68 of the drive shaft 40, the third body portion 90 engaged with the outer annular wall portion 52 of the hub 46, and the second body portion 88 proximate to the first shoulder 72 of the drive shaft 40 and proximate to the end wall portion 54 of the hub 46. A seal 94a is provided between the first body portion 86 and the second shaft portion 68, and a seal 94b is provided between the third body portion 90 and the outer wall portion 52 of the hub 46. The second body portion 88 has an inner section 96 extending radially outward from the end of the first body portion 86 and an outer section 98 extending radially outward from the end of the inner section 96. The inner section 96 is recessed relative to the outer section 98. The area between the end wall portion 54 of the hub 46, the second body portion 88, and a first end 100 of the first body portion 86 defines a clutch piston cavity 102. The clutch piston cavity 102 always aligns with, and is always in fluid communication with, the passage 78. A seal 104 is mounted on the outer section 98 and is configured to seal with the end wall portion 54. An annular pocket 106 is formed by the body portions 86, 88, 90. The clutch piston 36 is slidable axially along the second shaft portion 68 of the drive shaft 40 which causes the clutch piston cavity 102 to enlarge in size or decrease in size as described herein.

A plurality of spaced apart axially extending passageways 108 extend from the first end 100 of the first body portion 86 to an axially extending lubrication supply opening 110 extending from a second end of the first body portion 86. Each passageway 108 has a first section 112 extending in the axial direction from the first end 100 and a second section 114 extending in the axial direction from the second end of the first section 112 to the lubrication supply opening 110. The second section 114 has a diameter which is less than the diameter of the first section 112 and greater than the diameter of the lubrication supply opening 110. A first shoulder 116 is formed between the first and second sections 112, 114, and a second shoulder 118 is formed between the second section 114 and the lubrication supply opening 110.

The first body portion 86 has an elongated internal groove 120 which extends circumferentially around the interior wall forming the central passageway 92, and an external groove 122 which extends circumferentially around the outer perimeter of the first body portion 86. A plurality of spaced apart inner openings 124 are provided through the first body portion 86, and each extends from the internal groove 120 to the second section 114 of the respective passageway 108. A plurality of spaced apart outer openings 126 are provided through the first body portion 86, and each extends from the external groove 122 to the second section 114 of the respective passageway 108. Each inner opening 124 is spaced from the first end 100 of the first body portion 86 at a distance which is greater than the distance that each outer opening 126 is spaced from the first end 100. The passage 80 is always aligned with the elongated internal groove 120. As a result, fluid communication is always provided between the passage 80, the internal groove 120, the inner openings 124, the second section 114 of the respective passageways 108, the outer openings 126 and the external groove 122.

The clutch pack 18 seats in the central passageway 50 in the housing 28 proximate to the clutch piston 36. The clutch pack 18 is annular and is engaged with the splines of the drum 44 and engaged with the splines of the gear 42. The clutch pack 18 seats within a clutch pack cavity 128 of the central passageway 50 defined between the balance piston 30, the outer annular wall portion 52 of the drum 44, and the hub 62 of the gear 42. The clutch pack cavity 128 is always in fluid communication with the openings 64 in the gear 42. In a partially engaged position or in an engaged position of the clutch assembly 12, an end 130 of the third body portion 90 of the clutch piston 36 is engaged against the clutch pack 18. The clutch pack 18 has interleaved disks, such as separator plates 132, which are splined to the drum 44 at their outer peripheries, and friction disks 134, which are interleaved with the separator plates 132 and splined to the hub 62 of the gear 42 at their inner peripheries. The friction disks 134 may be monolithic or composite structures having friction-enhancing features that are attached to (e.g., adhered, embedded, coated, fixed with mechanical fasteners, etc.) or formed into (e.g., etched, machined, molded, cast, etc.) into a structural backing component thereof. The outer peripheries of the separator plates 132 may be notched to match, and thereby interfit and engage with, the drum 44 such that the separator plates 132 rotate with the drum 44. The inner peripheries of the friction disks 134 may be notched to match, and thereby interfit and engage with, the splined hub such that the friction disks 134 rotate with the hub 62 of the gear 42. The separator plates 132 and friction disks 134 are configured to slide axially along the drum 44 and the hub 62 of the gear 42. The retainer 34 is at the outer end of the clutch pack 18 and affixed to the drum 44 to retain the clutch pack 18 in the passageway 50 in the housing 28. Axially compressing or squeezing the clutch pack 18 between the clutch piston 36 and the retainer 34 engages the clutch assembly 12 and is provided by hydraulic actuation of the clutch piston 36 as described herein. The clutch pack 18 may also include springs (not shown) arranged to bias the separator plates 132 and the friction disks 134 toward a non-contacting position in a "force-separated" arrangement. For example, one or more large-diameter springs (e.g., wave or Belleville type springs) may be set within the annular gaps or channels extending about the radially outer periphery of the friction disks 134. The clutch pack 18 may be joined in a stacked configuration by a number of fasteners (not shown) (e.g., pins, rods, dowels, bolts, etc.), as needed. The clutch pack 18 may generate a considerable amount of heat when utilized to clutch the transmission unit 10, particularly during periods of relative contacting rotation between the separator plates 132 and the rapidly rotating friction disks 134 as a result of friction.

The balance piston 30 seats within the central passageway 50 of the housing 28 proximate to the clutch piston 36 and the clutch pack 18. As shown in FIGS. 7 and 8, the balance piston 30 has an annular first body portion 136, an annular second body portion 138 extending radially outward from a first end of the first body portion 136, and an annular third body portion 140 extending radially inward from a second end of the first body portion 136. The first and third body portions 136, 140 define a central passageway 142 having a reduced size opening 144 through the third body portion 140 at the second end of the balance piston 30. The second shaft portion 68 of the drive shaft 40 passes through the reduced size opening 144. The first body portion 136 has a first section 146 extending from the second body portion 138, and a second section 148 extending therefrom to the third body portion 140. The first section 146 is radially offset outwardly from the second section 148. A plurality of spaced apart openings 150 are provided through the second section 148 of the first body portion 136, and each extends from the outer perimeter of the second section 148 and intersects the passageway 142. The first body portion 136 surrounds the first body portion 86 of the clutch piston 36 and the second body portion 138 seats within the pocket 106 of the clutch piston 36. The second section 148 extends outwardly from the pocket 106. The openings 150 in the balance piston 30 are at least partially longitudinally outward of the ends of the lubrication supply openings 110 of the clutch piston 36. The openings 150 are aligned with and always in fluid communication with the clutch pack cavity 128 via the openings 64 in the gear 42. A seal 152 is provided between the first body portion 86 of the clutch piston 36 and the first body portion 136 of the balance piston 30, and a seal 154 is provided between the end of the third body portion 90 of the clutch piston 36 and the second body portion 138 of the balance piston 30. A balance piston cavity 156 is formed between the first section 146 of the first body portion 136 of the balance piston 30, the second body portion 138 of the balance piston 30, and the clutch piston 36. The balance piston 30 is fixed into position relative to the drive shaft 40 by suitable means, such as a retaining clip 158, which allows the drive shaft 40 to rotate relative to the balance piston 30 while preventing the axial outward movement of the balance piston 30 relative to the drive shaft 40. The outer openings 126 and the external groove 122 of the clutch piston 36 open into the balance piston cavity 156 such that the balance piston cavity 156 is always aligns with, and is always in fluid communication with, the passage 80.

The return spring 38 of the clutch assembly 12 surrounds the third shaft portion 70 of the drive shaft 40 and sits within an annular pocket 160 formed by the third shaft portion 70 of the drive shaft 40, the shoulder 74, the first body portion 86 of the clutch piston 36, and the first and third body portions 136, 140 of the balance piston 30. A first end of the return spring 38 is engaged with the end of the first body portion 86 of the clutch piston 36 and a second end of the return spring 38 is engaged with the third body portion 140 of the balance piston 30. The return spring 38 may be a coil spring, a lubricant spring, a plurality of Belleville disc springs, etc. The pocket 160 is always in fluid communication with the lubrication supply openings 110 in the clutch piston 36 and with the openings 150 in the balance piston 30.

The lubrication mechanism 32 is within the passageways 108 of the clutch piston 36 and extends into the clutch piston cavity 102, and is configured to seat within the lubrication supply opening 110 of the clutch piston 36. The lubrication mechanism 32 includes a plurality of cooling fluid shutoff pistons 164, a plurality of return springs 166, a plurality of retainers 168, and a plurality of seals 170, with one of each being seated within the respective passageway 108 of the clutch piston 36. In certain situations, the cooling fluid shutoff pistons 164 are seated within the lubrication supply openings 110 in a closed position, and when so positioned, the supply of lubrication which is used to cool the clutch pack 18 is prevented. In certain situations, the cooling fluid shutoff pistons 164 are not positioned within the lubrication supply openings 110 in an open position, and when so positioned, the supply of lubrication which is used to cool the clutch pack 18 is provided. The supply of lubrication to the balance piston cavity 156 is always provided when the cooling fluid shutoff pistons 164 are in each position.

Each cooling fluid shutoff piston 164 has an elongated shaft 172 having a first enlarged head section 174 extending therefrom and a second head section 176 extending from the first head section 174. The second head section 176 forms a first end 178, and the shaft 172 forms a second end 180. The first and second head sections 174, 176 seat within the first section 112 of the respective passageway 108 and the shaft 172 seats within the second section 114 of the respective passageway 108. The first head section 174 is configured to engage with the first shoulder 116 of the passageway 108. The return spring 166 surrounds the shaft 172 and engages the first head section 174 and the second shoulder 118 of the passageway 108. The retainer 168, which may be a clip, is seated within an annular groove 182 in the wall forming the first section 112 and is configured to engage the first head section 174 to prevent the cooling fluid shutoff piston 164 from exiting the passageway 108. The seal 170 is provided between the first head section 174 in the wall forming the first section 112. In the closed position, as described herein, the end 180 of the shaft 172 extends into the lubrication supply opening 110 of the clutch piston 36 and blocks fluid flow through the lubrication supply opening 110.

The lubricant flow paths 16a, 16c promote efficient cooling of the clutch pack 18. By virtue of this design, the clutch pack 18 is cooled during the period of time when the clutch assembly 12 is engaged and during which the most heat is being generated. At one or more other times or states, the clutch pack 18 will be cut off from the cooling fluid flow. Cooling the clutch pack 18 at the critical times/states aids in prolonging the serviceable lifespan of the clutch pack 18, and thus of the transmission unit 10. Efficiently managing the fluid flow avoids using system resources to flow fluid to the clutch pack 18 unnecessarily that could otherwise be used to cool other components and reduces drag and other friction or pressure losses resulting from the clutch pack 18 being rotated and/or moved through viscous fluids. Moreover, the efficiency the lubricant flow path 16c may be further enhanced by, as is the case in the illustrated example, delivering the fluid flow to the inner peripheries of the clutch pack 18 such that the fluid may be carried through the clutch pack 18 in a radially outward direction by centrifugal force.

A first lubricant flow path 16a is provided by the passage 78 and the clutch piston cavity 102. This first lubricant flow path 16a urges the clutch piston 36 away from the end wall portion 54 of the hub 46 to engage the clutch pack 18. A second lubricant flow path 16b is provided by the passage 80, the internal groove 120, the inner openings 124, the second sections 114 of the passageways 108, the outer openings 126, the external groove 122, and the balance piston cavity 156. This second lubricant flow path 16b supplies fluid to the clutch piston cavity 102 to provide a centrifugal balance to the clutch piston 36. A third lubricant flow path 16c is provided by the lubrication supply openings 110 when the ends 180 of the cooling fluid shutoff pistons 164 are not positioned therein, the pocket 160 in which the return spring 38 seats, the openings 150 of the balance piston 30, the openings 64 in the gear 42, and the clutch pack cavity 128 in which the clutch pack 18 seats. Fluid pressure in the first lubricant flow path 16a may vary between 0 PSI and 300 PSI depending upon the condition. Fluid pressure in the second lubricant flow path 16b is always between 20 PSI and 30 PSI.

Figure 9:
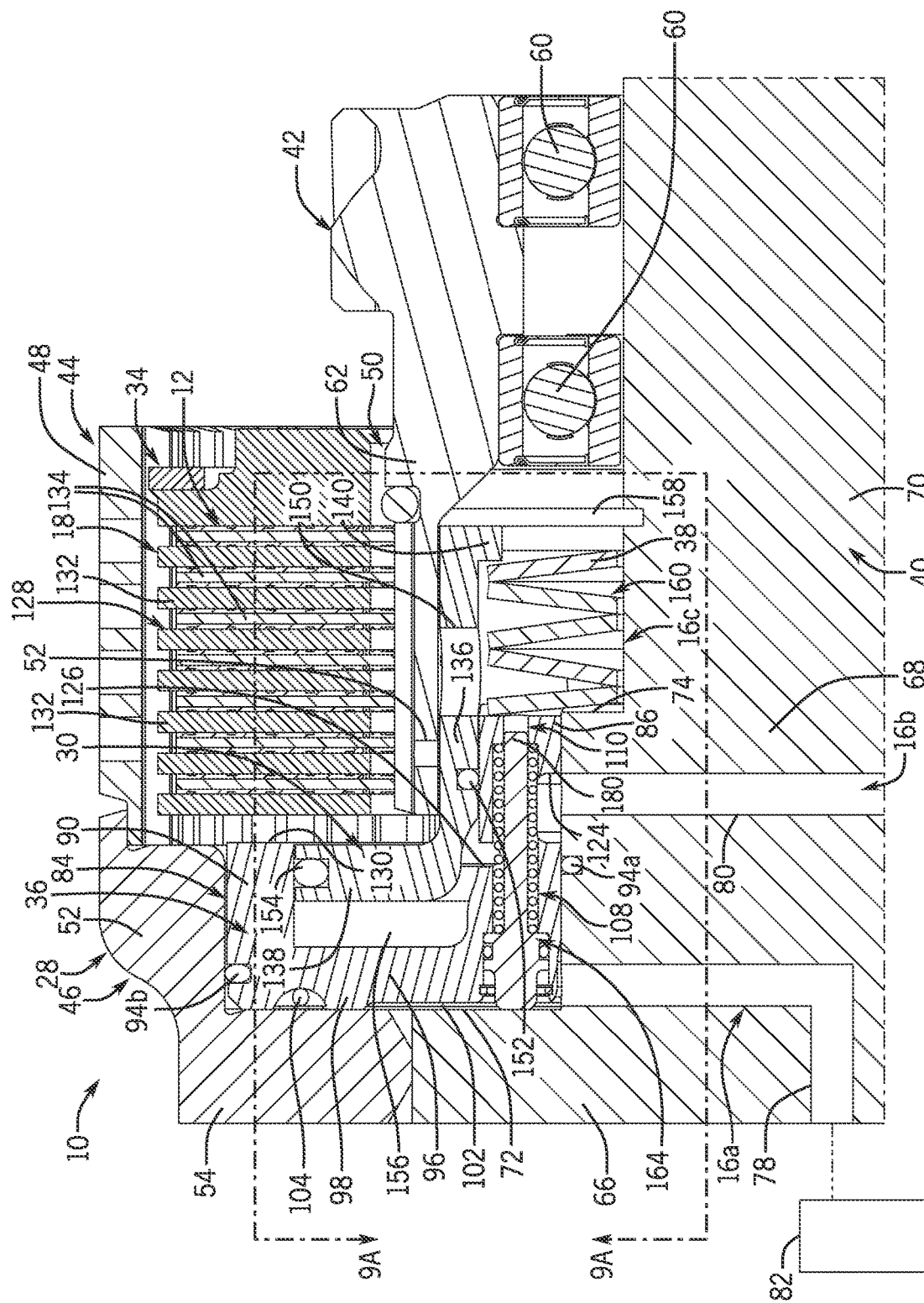
FIG. 9 is a cross-sectional view along line 9-9 of FIG. 4 showing the transmission unit in a disengaged position.
Figure 9A:
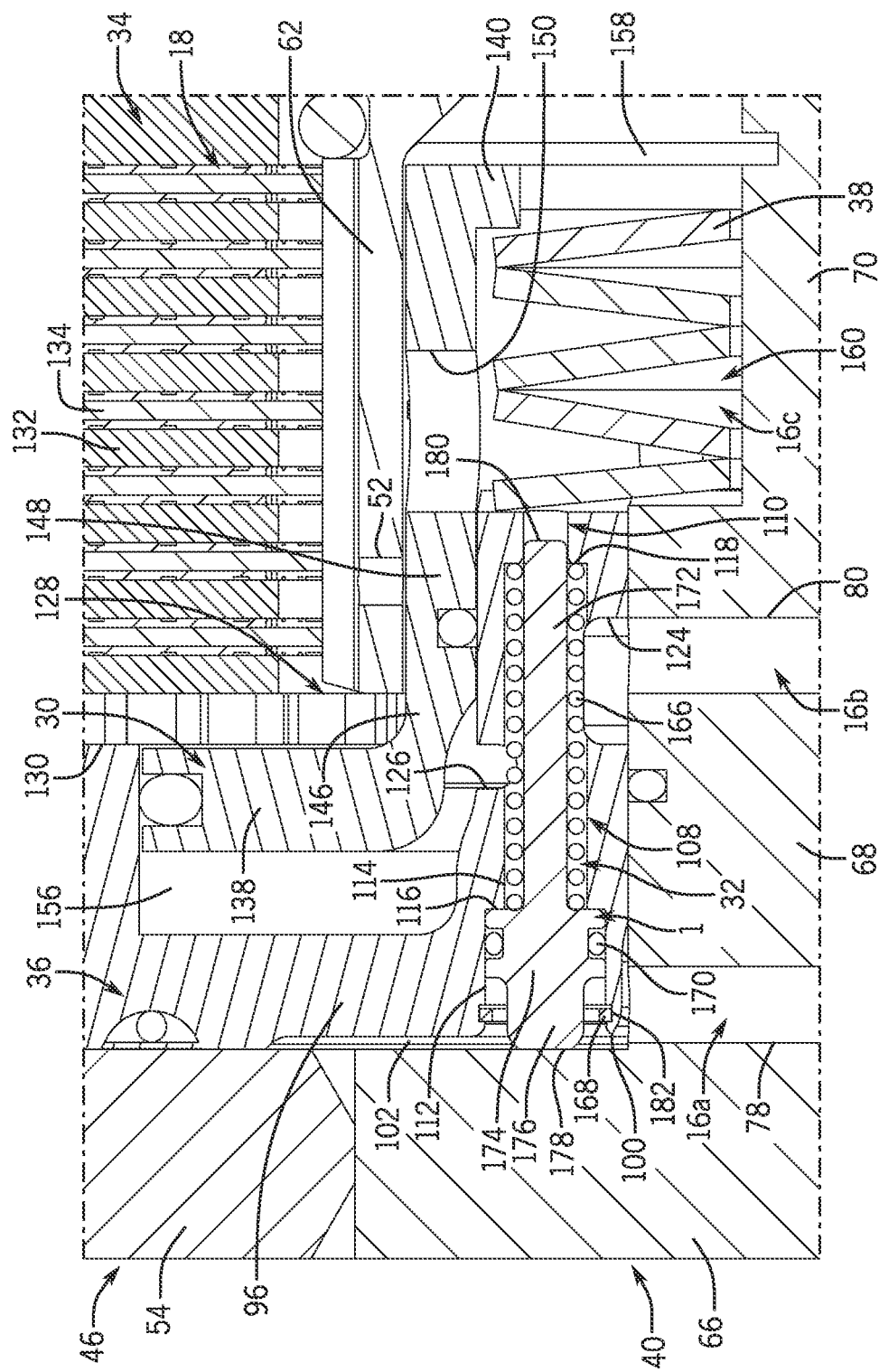
FIG. 9A is an enlarged partial cross-sectional view of FIG. 9.

When a clutch cycle is not called for, the control valve 82 is closed, and the clutch piston 36 is biased toward the end wall portion 54 by the return spring 38 to disengage the clutch piston 36 from the clutch pack 18 as shown in FIGS. 9 and 9A. The end 130 of the third body portion 90 of the clutch piston 36 is spaced from the clutch pack 18. Fluid flow is provided along the second lubricant flow path 16b into the balance piston cavity 156 and provides a centrifugal balance to the clutch piston 36. The ends 178 of the cooling fluid shutoff pistons 164 engage against the end wall portion 54 which slightly compresses the return springs 166 of the cooling fluid shutoff pistons 164, thereby causing the ends 180 of the cooling fluid shutoff pistons 164 to seat within the lubrication supply openings 110 in the closed position, and preventing fluid flow along the third lubricant flow path 16c. In this disengaged position, the clutch pack 18 is not compressed and no significant heat is being generated by the clutch pack 18 so cooling is not needed. The drive shaft 70 is turning at a first speed and the gear 42 is turning at a second different speed.

Figure 10:
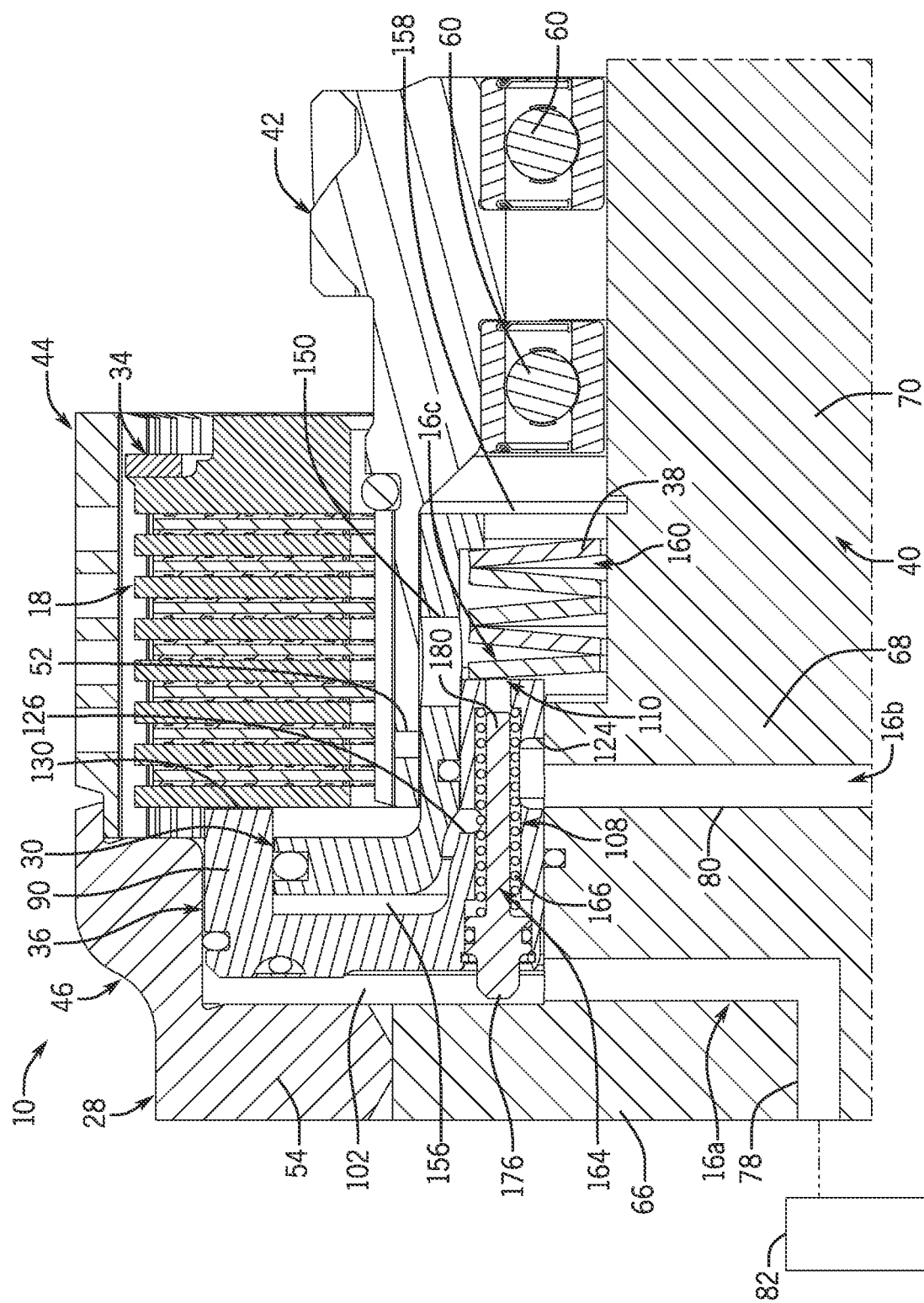
FIG. 10 is a cross-sectional view like FIG. 9 showing the transmission unit in a "kiss" engagement, or a slip position.

During a clutch cycle, the clutch piston 36 is moved into a "kiss" condition with the clutch pack 18 which allows for slipping of the clutch pack 18 as shown in FIG. 10, while providing for cooling of the clutch pack 18 during the time since heat is being generated by the clutch pack 18 as a result of the slipping. The control valve 82 is operated to allow fluid to flow along the first lubricant flow path 16a at a first fluid pressure which is greater than the pressure at which the balance piston cavity 156 is being filled, but not great enough to maintain the cooling fluid shutoff pistons 164 in their closed positions. This engages the clutch piston 36 with the clutch pack 18 but still allows for the slip of the clutch pack 18. The first fluid pressure is high enough to move the clutch piston 36 to engage the clutch pack 18 and to compress the return spring 38, but not high enough to counteract the return springs 166 to keep the cooling fluid shutoff pistons 164 engaged within the lubrication supply openings 110. Since the first fluid pressure is below what keeps the cooling fluid shutoff pistons 164 seated in the lubrication supply opening 110, the return springs 166 expand which causes the cooling fluid shutoff pistons 164 to move toward the end wall portion 54 of the hub 46, into the clutch piston cavity 102, and out of the lubrication supply openings 110 and into the open positions. Since the ends 180 of the cooling fluid shutoff pistons 164 are out of the lubrication supply openings 110, fluid flows along the third lubricant flow path 16c and into the clutch pack cavity 128. The third lubricant flow path 16c supplies cooling fluid to the clutch pack 18, while fluid is simultaneously being supplied along the second lubricant flow path 16b to the balance piston cavity 156 to provide centrifugal balance to the clutch piston 36.

Figure 11:
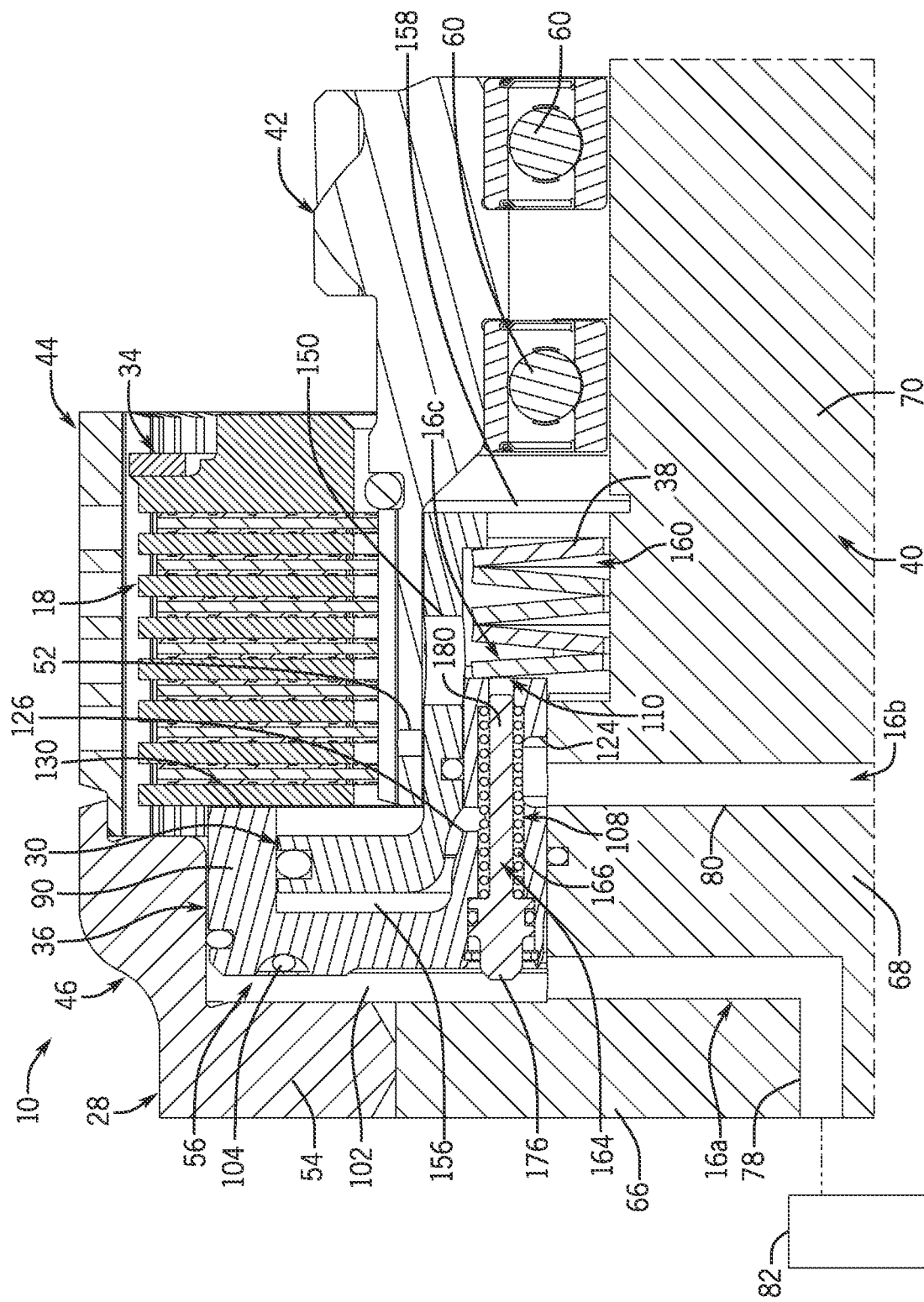
FIG. 11 is a cross-sectional view like FIG. 9 showing the transmission unit in a fully engaged clutching position.

Once parameters based upon a desired clutch temperature on the clutch pack 18 are reduced to a level which indicates that the heat dissipation on the clutch pack 18 is no longer necessary, the control valve 82 is operated to increase the pressure of the fluid flowing along the first lubricant flow path 16a to a second greater pressure to attain the position shown in FIG. 11. The parameters are calculated with an algorithm which actively predicts clutch temperature before, during and after gear shifts. In the position as shown in FIG. 11, the clutch piston 36 is fully pressed against the clutch pack 18 away from the end wall portion 54 of the hub 46, and the return spring 38 is compressed. The pressure on the second head sections 176 of the cooling fluid shutoff pistons 164 cause the cooling fluid shutoff pistons 164 to be biased into engagement with the shoulders 116 to compress the return springs 166 and seat the ends 180 of the cooling fluid shutoff pistons 164 in the lubrication supply openings 110, thereby preventing fluid flow through the third lubricant flow path 16c. In this condition, the drive shaft 70 and the gear 42 turn at the same speed.

As a result, the lubrication to the clutch pack 18 can be controlled to cool when the clutch assembly 12 is engaged in the "kiss" position. Since the clutch pack 18 is only cooled when necessary, pump energy costs are reduced.

Figure 12:
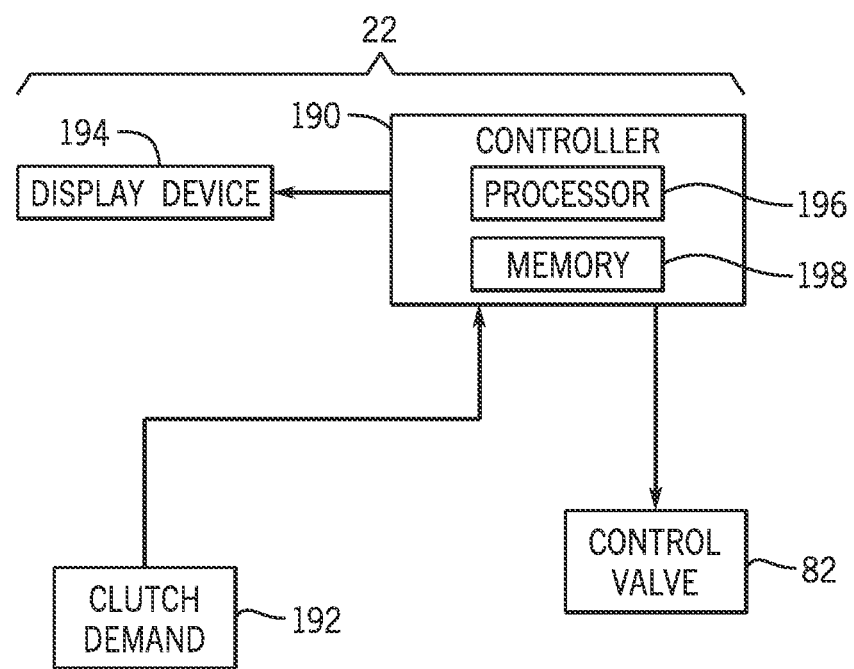
FIG. 12 is a schematic of a hydraulic and electronic control system of the transmission.

As shown in FIG. 12, the hydraulic and electronic control system 22 includes a controller 190 operably coupled to the control valve 82 and operably coupled to a clutch demand 192 which indicates to the controller 190 that a clutch cycle is to commence. The clutch demand 192 may commence by an operator depressing a pedal of the work vehicle 14 or the controller programming indicating that a clutch cycle is necessary. Some components of the controller 190 are usefully (although non-essentially) remotely located from the transmission unit 10; e.g., integrated into the operator station of the work vehicle 14. Such remote positioning helps protect such components from the harsh operating environment of the transmission unit 10. The example control system 22 may further include a display device 194 for providing information to the operator.

The controller 190 can assume any form suitable for performing the functions described throughout this document. Further, the term "controller," as appearing herein, is utilized in a non-limiting sense to generally refer to the processing architecture of the transmission unit 10, shown as processor 196. The controller 190 can encompass or may be associated with any practical number of processors, control computers, computer-readable memories, power supplies, storage devices, interface cards, and other standardized components. The controller 190 may also include or cooperate with any number of firmware and software programs or computer-readable instructions designed to carry-out the various process tasks, calculations, and control/display functions described herein. Such computer-readable instructions may be stored within a non-volatile sector of a memory 198 accessible to the controller 190. While generically illustrated in FIG. 12 as a single block, the memory 198 can encompass any number and type of storage media suitable for storing computer-readable code or instructions, as well as other data utilized to support the operation of the transmission unit 10. The memory 198 may be integrated into the controller 190 in embodiments as, for example, a system-in-package, a system-on-a-chip, or another type of microelectronic package or module.

When included in the example control system 22, the display device 194 may be located within the operator station or cabin of the work vehicle 14. An operator may refer to imagery generated on the display device 194 when entering commands or inputting data into the control system 22. Additionally or alternatively, visual alerts may be generated on the display device 194. The display device 194 may be affixed to the static structure of the operator cabin or can be a portable electronic display device, such as a tablet computer or laptop, which is carried into the operator station by an operator and which communicates with the various other components of the example control system 22 over a physical connection or wireless connection to perform the desired display functionalities.

Figure 13:
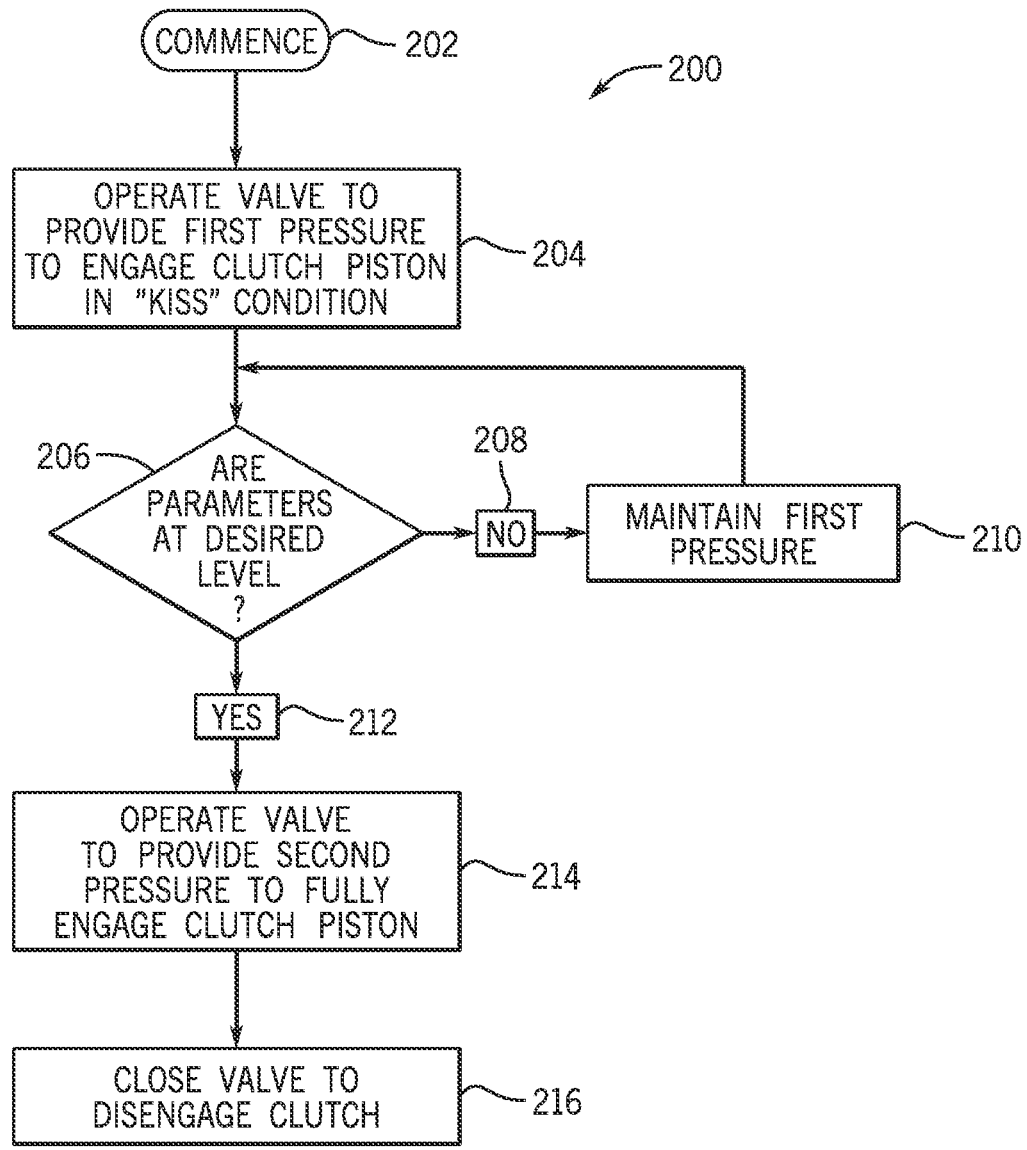
FIG. 13 is a flow chart illustrates steps of an embodiment of a clutch cycle process.

Referring now to the flow chart shown in FIG. 13, a clutch cycle process 200 for the control of the heat dissipation of the clutch pack 18 is presented in accordance with a non-limiting example embodiment. The clutch cycle process 200 includes a number of process steps, each of which is described below. Depending upon the particular manner in which the clutch cycle process 200 is implemented, each step generically illustrated in FIG. 13 may entail a single process or multiple sub-processes. Further, the steps illustrated in FIG. 13 and described below are provided by way of non-limiting example only. In alternative embodiments of the clutch cycle process 200, additional process steps may be performed, certain steps may be omitted, and/or the illustrated process steps may be performed in alternative sequences.

The clutch cycle process 200 commences at STEP 202 in response to a clutch demand 192. At STEP 204, the valve 82 is opened to provide a fluid flow at a first fluid pressure, for example the fluid is fed into the first lubricant flow path 16a at a pressure of 220 PSI. This engages the clutch piston 36 with the clutch pack 18 in the "kiss" condition and allows the cooling fluid shutoff pistons 164 to move to the open position and allow cooling of the clutch pack 18. At STEP 206, the controller 190 determines if the parameters are at a desired level which indicates that cooling of the clutch pack 18 is no longer necessary. If the controller 190 determines that the parameters are not at the desired level, STEP 208, then the pressure is maintained to keep the cooling fluid shutoff pistons 164 in the open positions at STEP 210, and the clutch cycle process 200 returns to STEP 206. If the controller 190 determines that the parameters are at the desired level, STEP 212, then the valve 82 is operated at STEP 214 to increase the pressure of the fluid flowing along the first lubricant flow path 16a to a second fluid pressure which is above the first fluid pressure that closes the cooling fluid shutoff pistons 164 to prevent the fluid flow along the third lubricant flow path 16c, and to provide a full clutching action. When the clutch cycle completes, the clutch cycle process 200 progress to STEP 216 and the controller 190 closes the valve 82 to disengage the clutch pack 18.

When the lubrication of the clutch pack 18 is necessary, the pressure along the lubricant flow path 16a is controlled to a setpoint above the 1:1 clutch torque reserve needed for the present gear selection, but below the setpoint needed to move the cooling fluid shutoff pistons 164 to the closed position. Once the desired temperature of the clutch pack 18 is achieved, the pressure along the lubricant flow path 16a can be raised to the maximum achievable, which will move the cooling fluid shutoff pistons 164 to the closed position and terminate lubrication of the clutch pack 18. Since the lubrication is managed, this allows for optimized use of transmission lubrication. This allows a designer to provide needed lubrication to other components as soon as the clutch pack 18 is cool. This also avoids having to oversize a transmission lubrication pump, and avoids the addition of separate devices such as priority valving that is more costly.

Figure 14:
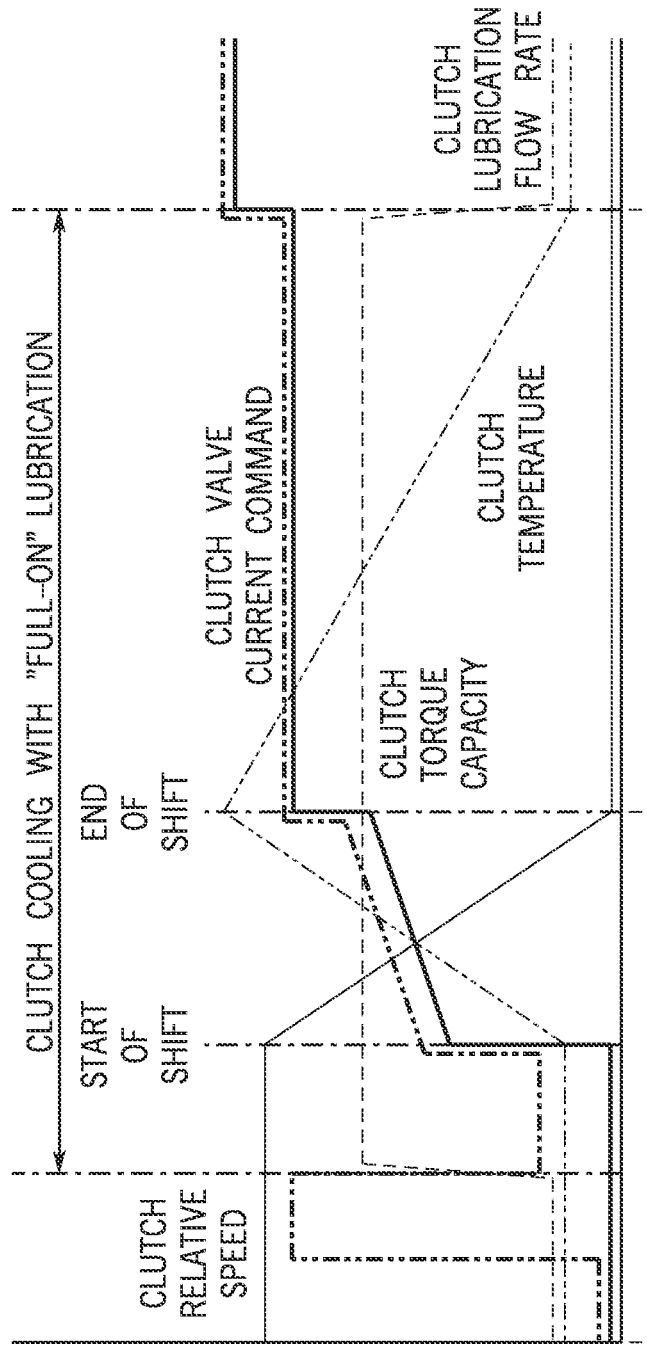
FIG. 14 is a graphical example of a clutch cycle.

A graphical example of a clutch cycle is shown in FIG. 14. At the start of the graph, the transmission unit 10 is in the disengaged position as shown in FIG. 9. Once a clutch demand 192 is received, the fluid pressure along the lubricant flow path 16a into the clutch piston cavity 102, which is represented by the line showing the clutch valve current command in the chart of FIG. 14, is dramatically increased to fast fill the clutch piston cavity 102 and move the clutch piston 36 toward the clutch pack 18, and then reduced to a certain level to start the shift. During this time period, the clutch relative speed is high and generally constant, and the clutch torque capacity, the clutch temperature and the clutch lubrication flow rate along lubricant flow path 16c are low and are generally constant. This reduction of the fluid pressure along the lubricant flow path 16a to the first fluid pressure moves the cooling fluid shutoff pistons 164 to the open position, as shown in FIG. 10, thereby dramatically increasing the lubrication flow along lubricant flow path 16c and dramatically increasing the lubrication flow rate to the clutch pack 18. Just prior to the start of the shift, the clutch valve current command, the clutch torque capacity and the clutch temperature are low. At the start of the shift, the clutch valve current command dramatically rises to increase the pressure along the lubricant flow path 16a to move the clutch piston 36 into the "kiss" position with the clutch pack 18, and the clutch torque capacity generally follows the clutch valve current command for the remainder of the clutch cycle. As a result, during the shift, heat is generated and the clutch temperature begins to rise rapidly. The flow along lubricant flow path 16c remains generally constant which provides cooling fluid to the clutch pack 18. The clutch valve current command and the clutch torque capacity gradually rise during the shift, and the clutch relative speed gradually decreases during the shift. At the end of the shift when the clutch temperature is at its maximum, the pressure to the lubricant flow path 16a shown by the clutch valve current command is again dramatically increased, but does not rise to the level which moves the cooling fluid shutoff pistons 164 to the closed position. During this time period, the cooling fluid is supplied along lubricant flow path 16c to the clutch pack 18 and the clutch temperature gradually decreases, and the clutch relative speed remains low. When the desired parameter is reached, the clutch valve current command is again dramatically increased, along with clutch torque capacity, which increases the fluid pressure along the lubricant flow path 16a to the second fluid pressure, thereby causing the cooling fluid shutoff pistons 164 to move to the closed position as shown in FIG. 11. This causes the clutch piston 36 to fully engage with the clutch pack 18 to provide a full clutching action, while shutting off the cooling flow to the clutch pack.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A lubricant management system for a work vehicle transmission unit having a drive shaft and a gear selectively coupled to the drive shaft by a clutch assembly having a clutch piston contained in a clutch piston cavity configured to receive fluid under pressure and a clutch pack, the lubricant management system comprising:
    a balance piston contained in a balance piston cavity configured to receive fluid under pressure and provided between the clutch piston and the balance piston;
    a cooling fluid shutoff piston mounted in a passageway of the clutch piston, the passageway being open to the balance piston cavity and having a lubrication supply opening that is in an open position when the cooling fluid shutoff piston is not within the lubrication supply opening and that is in a closed position when the cooling fluid shutoff piston is within the lubrication supply opening;
    a valve configured to control pressure of fluid flow into the clutch piston cavity; and
    a controller, having processing and memory architecture, operatively coupled to the valve and configured to;
        command the valve to adjust the pressure of the fluid flowing into the clutch piston cavity during operation of the clutch assembly; and
        command the valve to open to allow fluid flow under a first pressure into the clutch piston cavity which engages the clutch piston with the clutch pack in a slip condition, wherein the first pressure allows the cooling fluid shutoff piston to be in the open position.

2. The lubricant management system of claim 1, wherein the controller is further configured to:
    command the valve to open to allow fluid flow under a second pressure into the clutch piston cavity which fully engages the clutch piston with the clutch pack, wherein the second pressure causes the cooling fluid shutoff piston to close the lubrication supply opening.

3. The lubricant management system of claim 2, wherein the second pressure is greater than the first pressure.

4. The lubricant management system of claim 2, wherein the controller is further configured to command the valve to close when a clutch cycle is completed, thereby preventing fluid flow into the clutch piston cavity and disengaging the clutch piston from the clutch pack.

5. The lubricant management system of claim 4, wherein the cooling fluid shutoff piston is further moved to the closed position when the clutch cycle is completed.

6. The lubricant management system of claim 2, wherein the controller acts based upon parameters that are based upon a desired clutch temperature of the clutch pack.

7. The lubricant management system of claim 1, wherein the controller acts in response to a clutch demand.

8. The lubricant management system of claim 1, wherein the controller acts based upon parameters that are based upon a desired clutch temperature of the clutch pack.

9. A transmission unit having a lubrication management system comprising:
    a drive shaft and a gear selectively coupled to the drive shaft by a clutch assembly having a clutch piston contained in a clutch piston cavity configured to receive fluid under pressure and a clutch pack, the lubricant management system comprising:
    a balance piston contained in a balance piston cavity configured to receive fluid under pressure and provided between the clutch piston and the balance piston;
    a cooling fluid shutoff piston mounted in a passageway of the clutch piston, the passageway being open to the balance piston cavity and having a lubrication supply opening that is in an open position when the cooling fluid shutoff piston is not within the lubrication supply opening and that is in a closed position when the cooling fluid shutoff piston is within the lubrication supply opening;
    a valve configured to control pressure of fluid flow into the clutch piston cavity; and
    a controller, having processing and memory architecture, operatively coupled to the valve and configured to;
        command the valve to adjust the pressure of the fluid flowing into the clutch piston cavity during operation of the clutch assembly; and
        command the valve to open to allow fluid flow under a first pressure into the clutch piston cavity which engages the clutch piston with the clutch pack in a slip condition, wherein the first pressure allows the cooling fluid shutoff piston to be in the open position.

10. The transmission unit of claim 9, wherein the controller is further configured to:
    command the valve to open to allow fluid flow under a second pressure into the clutch piston cavity which fully engages the clutch piston with the clutch pack, wherein the second pressure causes the cooling fluid shutoff piston to close the lubrication supply opening.

11. The transmission unit of claim 9, wherein the controller acts based upon parameters that are based upon a desired clutch temperature of the clutch pack.

* * * * *